W. S. OLSON.
FLUID TRANSMISSION.
APPLICATION FILED DEC. 8, 1917.
1,363,907.
Patented Dec. 28, 1920.
2 SHEETS—SHEET 1.
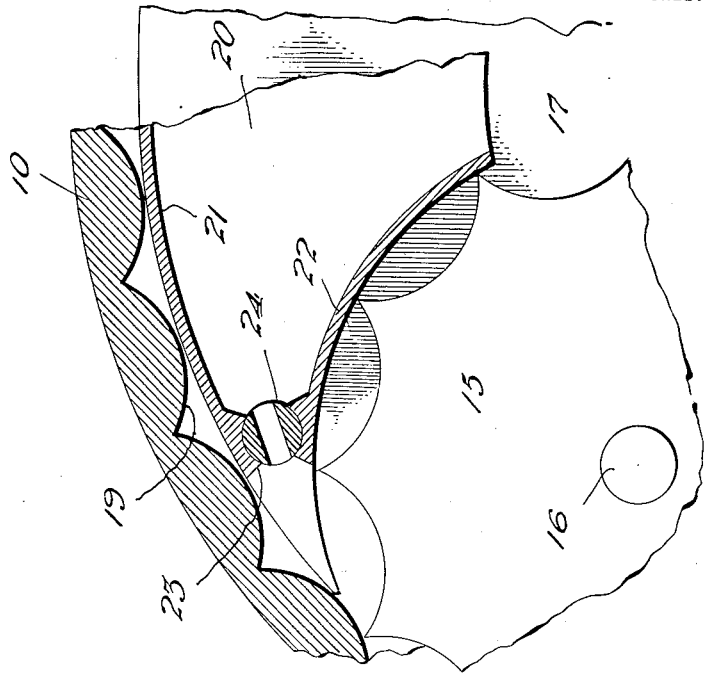
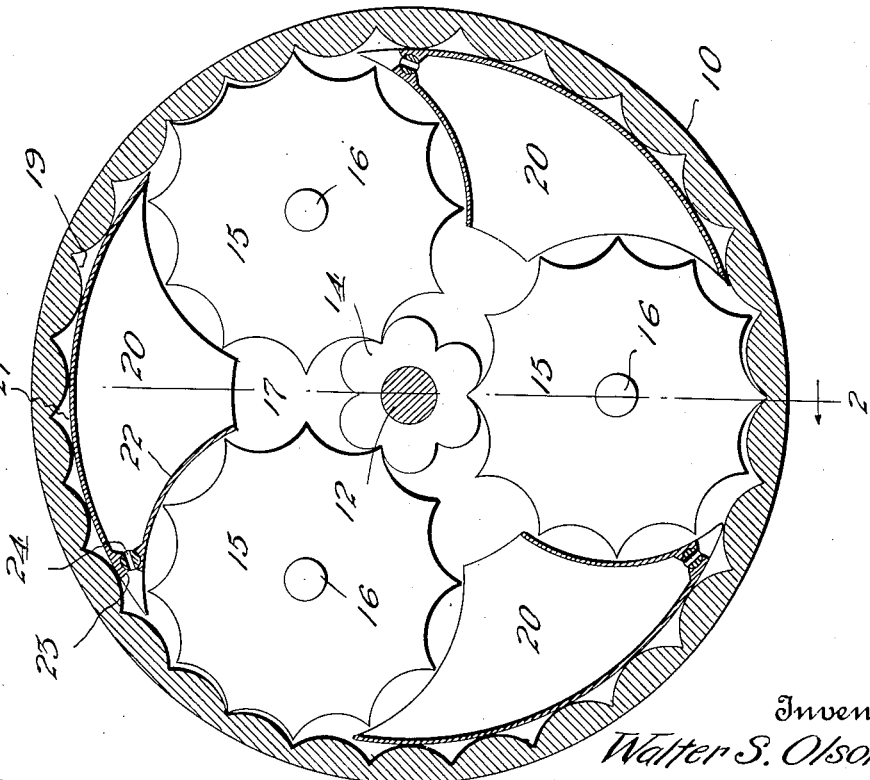
Inventor
Walter S. Olson.
By Victor J. Evans
Attorney
Witnesses

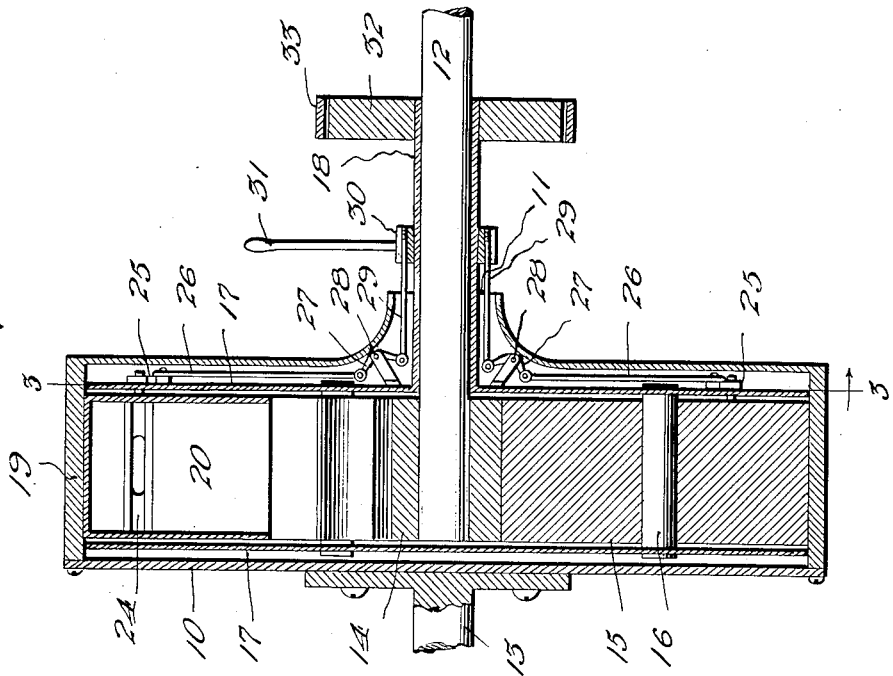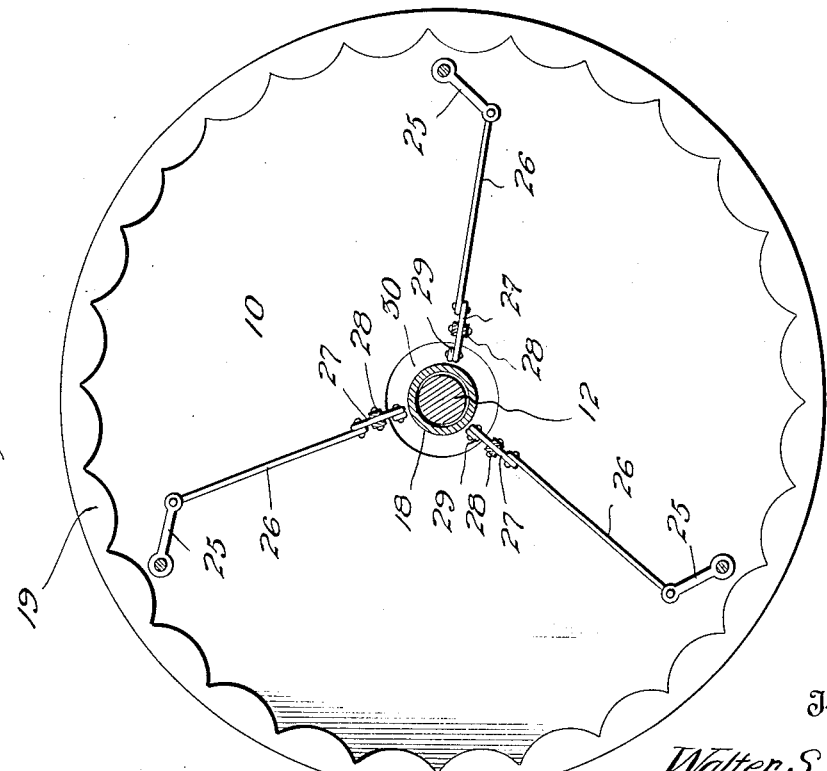

UNITED STATES PATENT OFFICE.

WALTER S. OLSON, OF BOWMAN, NORTH DAKOTA.

FLUID TRANSMISSION.

1,363,907. Specification of Letters Patent. Patented Dec. 28, 1920.

Application filed December 8, 1917. Serial No. 206,256.

*To all whom it may concern:*

Be it known that I, WALTER S. OLSON, a citizen of the United States, residing at Bowman, in the county of Bowman and State of North Dakota, have invented new and useful Improvements in Fluid Transmissions, of which the following is a specification.

This invention relates to fluid transmission mechanism and aims to provide means for locking a driving and a driven shaft together, in a manner to provide for a change of speed of the driven shaft without changing the speed of the driving shaft.

The primary object of the invention is to provide a smooth running easily operated mechanism for the above purpose, which is positive in operation, simple in construction and which may be manufactured at a moderate cost.

For the accomplishment of the above objects, the invention includes a plurality of intermeshing gears carried by the driving and driven shafts, which are mounted within a casing filled with oil, a novel arrangement of valves being provided which when open, will permit of the gears running idly so that no motion is transmitted to the driven shaft, but which may be closed to cause the gear of the driving shaft to operate the driven shaft, the relative speeds of the shaft being regulated by the degree to which the valves are opened.

The invention also aims to provide a novel form of reversing mechanism which may be operated to reverse the direction of rotation of the driven shaft, without reversing the direction of rotation of the driving shaft.

The invention also consists of the following novel combinations and arrangements of parts, to be hereinafter more fully described and illustrated in the accompanying drawings; in which:

Figure 1 is a sectional view through the casing of the transmission mechanism with the fluid chambers also in section, the driving gears however, being shown in elevation.

Fig. 2 is a sectional view on the line 2—2 of Fig. 1.

Fig. 3 is a similar view on the line 3—3 of Fig. 2.

Fig. 4 is an enlarged fragmentary sectional view through one end of one of the fluid chambers and the contiguous gearing.

Referring in detail to the drawings, the invention includes a housing 10, of cylindrical form, the said housing being provided upon one face with a concentrically located bearing 11, through which one end of a driving shaft 12 enters the housing. Connected to the housing 10 in any desired manner is a shaft 13, hereinafter referred to as the driven shaft, this shaft being located directly opposite the shaft 12 and in alinement therewith.

The shaft 12 has secured upon its inner end a pinion 14, which is engaged by a plurality of gears 15, which are mounted to revolve on shafts 16 carried by a gear frame 17. This frame may be of any desired construction and may consist of opposed plates provided with bearings for the shafts 16 which are arranged concentrically around the shaft 12. This frame is mounted for rotation within the housing 10 and is provided with a concentrically disposed sleeve 18, which is adapted to project through a bearing in the sleeve 11, the sleeve 11 in turn providing a bearing for the shaft 12. Carried by the housing 10 is a ring gear 19, which is adapted to engage each of the intermediate gears 15, these last mentioned gears upon rotation of the driven shaft 12 running idly between the pinion 14 and the gear 19, so that the gear frame will revolve around the shaft 12.

Also carried by the gear frame 17 and positioned between each of the intermediate gears 15, is a fluid chamber 20, preferably of segmental shape. This chamber is hollow and of the same relative width as the gears, the cross sectional shape of these chambers being substantially rectangular as shown in Fig. 2. The sides 21 and 22 respectively of the fluid chambers 20 are closed, while the opposite sides are open, the meeting point or apex of the sides 21 and 22 being formed with a passage 23, which is regulated by a valve 24. This valve is operated to open and close the passage 23 through the medium of an arm 25 extending radially from the valve stem and having pivotally connected thereto one end of a rod 26, the opposite end of this rod being connected to one arm of the bell crank 27 pivoted at 28 within the housing 10. The other arm of the bell crank is pivotally connected to a rod 29, which is in turn connected to the collar 30 slidable upon the sleeve 18, an operating lever 31 being provided for this purpose.

By shifting the collar 30, to which each of the rods 29 of their respective valves 24 are connected, the latter may be revolved to open or close the passage 23 of the fluid chambers 20.

In the operation of the mechanism the housing is filled with oil or other suitable fluid and when the valves 24 are open the pinion 14 will revolve the gears 15, without imparting any movement to the ring gear 19, the intermediate gears 15 and their supporting frame revolving idly within the housing. When the valves 24 are operated to close the passages 23 to prevent the passage of oil through the fluid chambers 20, the gears 15 will revolve the ring gear 19 through the compression of the fluid between the intermeshing teeth of the said gears and drive the gear 19 and with it the shaft 13, the relative speed of the last mentioned shaft with respect to the shaft 12 being regulated by the valves 24.

In order to provide for reversing the direction of travel of the shaft 13 with respect to the shaft 12, the latter has mounted to revolve freely thereon a drum 32, which is connected through the medium of the sleeve 18 with the gear frame 17. This frame normally revolves upon the shaft 12, but may be held against rotation by means of the band 33 and when so held will prevent rotation of the gear frame, so that upon closing the valves 24 the ring gear 19 will be caused to operate in a direction opposite the rotation of the pinion 14.

Various changes may be made in the form, proportion and minor details of construction, for example the form of valve and its operating means shown are merely for purposes of illustration and the right is reserved to make such changes as will fall within the scope of the appended claim.

Having described the invention what is claimed is:

A power transmission mechanism embodying a driving shaft, a driven shaft, gearing connecting said shafts, a fluid containing housing for said gearing, rotatably mounted fluid chambers having a large open entrance end and a restricted outlet end and located within said housing between the gears and means located at the outlet end of the fluid chambers for controlling the passage of fluid therethrough to regulate the speed of the driven shaft.

In testimony whereof I affix my signature.

WALTER S. OLSON.